United States Patent [19]

Hall et al.

[11] Patent Number: 4,815,400

[45] Date of Patent: Mar. 28, 1989

[54] HYGROSCOPIC FERTILIZER APPLICATOR

[76] Inventors: Shade W. Hall, Persia, Iowa 51563;
Eugene L. Peters, P.O. Box 54;
Robert E. Jensen, P.O. Box 76, both
of Tennant, Iowa 51574; Bernard K.
Cox, Jr., 5718 S. 98th, Omaha, Nebr.
68127

[21] Appl. No.: 876,770

[22] Filed: Jun. 20, 1986

[51] Int. Cl.$^4$ ............................................. A01C 15/04
[52] U.S. Cl. ............................................. 111/1; 111/34;
111/7; 415/176
[58] Field of Search .......................... 111/1, 34, 6, 7;
406/38-44, 86, 99, 123, 79; 239/654-655;
415/175-176; 126/101; 165/47

[56] References Cited

U.S. PATENT DOCUMENTS

| | | | |
|---|---|---|---|
| 2,919,160 | 12/1959 | Blackburn | 406/138 X |
| 3,986,638 | 10/1976 | Dehart | 111/1 X |
| 4,296,695 | 10/1981 | Quanbeck | 111/34 |
| 4,555,200 | 11/1985 | Morrison | 165/185 X |
| 4,642,149 | 2/1987 | Harper | 165/38 X |

FOREIGN PATENT DOCUMENTS 142942 7/1980 German Democratic Rep. ... 406/12

OTHER PUBLICATIONS

"Blending and Conveying of Ceramic Raw Materials by Fluidization", Koble et al., from Ceramic Bulletin, vol. 32, No. 11, pp. 367-372, 1953.

Primary Examiner—Robert A. Hafer
Assistant Examiner—Danton D. DeMille
Attorney, Agent, or Firm—John A. Beehner

[57] ABSTRACT

A hygroscopic-fertilizer-pellet applicator of the type having a fan blowing air through small tubes to propel the pellets to tube outlets for underground placement. The tendency of the hygroscopic fertilizer to absorb moisture, and to clog the small tubes, is relieved herein by heating the air which then dries the fertilizer. The source of heat is to have the fan pulling ambient air through a heat exchange, which latter is heated by hydraulic fluid flowing through it from a hydraulic motor operating the fan. The compression of the air by the fan further heats the air.

1 Claim, 1 Drawing Sheet

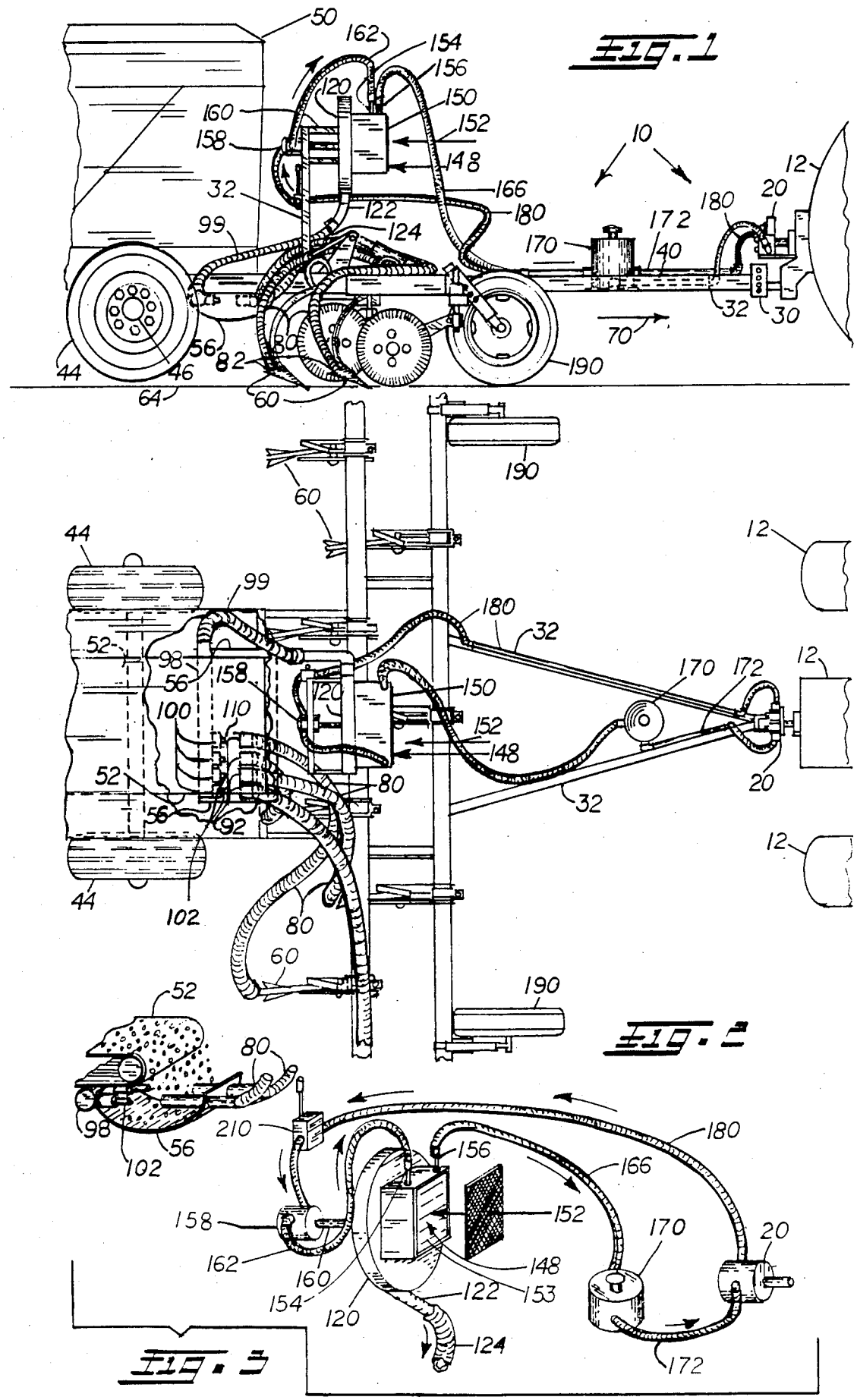

HYGROSCOPIC FERTILIZER APPLICATOR

BACKGROUND OF THE INVENTION

In the prior art the clogging of hygroscopic fertilizer in the small tubes of applicators has been a costly unsolved problem.

The obtaining of relatively dry fertilizer does not solve this problem because moisture in the air is absorbed into the fertilizer even as it sits in the delivery hopper which is moved down the field on wheels. The clogging is greatest in humid weather.

An objective, therefore, is to make use of the heat generated in the hydraulic fluid flowing through the hydraulic motor that operates the fan so that this heat is placed in the air that the fan blows onto the fertilizer. In this way, a readily available and otherwise wasted source of heat is utilized by the use of an inexpensive heat exchanger.

BRIEF DESCRIPTION OF THE DRAWINGS

FIG. 1 is a side elevation of the fertilizer applicator assembly of this invention of which only a part of the rear portion of the tractor thereof is shown.

FIG. 2 is a top plan view of the applicator assembly of FIG. 1 showing only certain ones of the tubes that deliver pellets to outlets behind the blades, the other tubes and most of the blades not being shown, portions of laterally elongated frame members being broken away and sections of a forward lateral frame member being broken away and wheels thereof being illustrated as being closer to the center of the machine than they are. The top of the hopper and a portion of the conveyor are broken away to show parts therebeneath.

FIG. 3 is a flow diagram of the hydraulic system of the tractor with some parts diagramatically shown. A section of an end portion of a modification of the conveyor and the trough and air manifold are shown diagrammatically with fertilizer.

DESCRIPTION OF THE PREFERRED EMBODIMENT

The hygroscopic-particle-fertilizer applicator assembly of this invention is generally indicated at 10 and comprises a towing vehicle or tractor generally indicated at 12 having a hydraulic pump 20 mounted thereon. The tractor is attached by a hitch assembly 30 to the frame 32 of a towed applicator generally indicated at 40. The frame 32 is supported on right and left wheels 44 rotating on axles 46 fixed to the frame 32.

Above the frame is a fertilizer pellet bin 50 from which fertilizer pellets are free to flow downwardly to a conveyor diagramatically shown at 52. The conveyor 52 and all parts previously described herein are common dry fertilizer prior art applicator parts.

It is to be understood that the conveyor has openings, not shown, therein which permit pellets to fall therethrough downwardly into a pellet trough 56 secured to the frame 32 and open at its top.

Attached to the frame are a plurality of ground-opening blades 60, behind each of which, a pellet-receiving trench 64 is formed as the assembly moves forwardly in the direction of an arrow 70. The blades 60 are fixed to the frame 32 in a prior art manner, and behind each blade is the lower end of one of many pellet-delivery tubes 80 having outlets 82 disposed behind the blades 60 in positions for delivering pellets to the respective trenches 64. In front of each blade 60 is a disc 90 mounted on the frame 32 for rotation to loosen the ground in front of each blade, as is common.

The upper ends of each tube 80 extends through the forward side of the pellet trough 56 and each have an inlet 92 opening upon the interior of the trough.

Behind the trough 56 is a manifold 98 and from it air-jet conduits 100 extend through the rear wall of the trough 56 in positions such that each has its outlet 102 directed toward and spaced from the respective inlet 92 of a respective tube 80.

The spaces between the respective conduit outlets 102 and the respective tube inlets 92 each define a respective fertilizer-receiving space 110. It is into these spaces 110 that fertilizer pellets or particles drop.

A fan 120 is mounted on the frame 32 and has an outlet 122 connected to an airline 124 which leads to the air manifold 98 for blowing air through the conduits 100 so as to force pellets from the spaces 110 into the tubes 80.

Ambient air is also entrained and sucked in with the air passing from the conduits 100 to the tubes 80, whereby there is a venturi or vacuum effect sucking pellets into the spaces 110 and into the tubes 80.

All parts heretofor described are common in dry fertilizer applicators.

A moisture-removing assembly for removing moisture from the air flowing into the fan 12 0 is generally indicated at 148 and comprises a heat exchanger 150 disposed in the pathway of air flowing into the fan 120, such pathway being indicated by an arrow 152.

The heat exchanger 150 has a fluid inlet 154 and a fluid outlet 156.

The fan is driven by a hydraulic motor 158 which drives the fan through a shaft 160.

A return-line 162 delivers fluid from the outlet of the hydraulic motor 158 to the inlet 154 of the heat exchanger 150. The outlet 156 of the heat exchanger 150 is connected by a second return-line 166 to a fluid reservoir 170 mounted on the frame 32.

A third return-line 172 extends from the reservoir 170 to the inlet of a pump 20 on the tractor 12.

The outlet of the pump 20 is connected by a line 180 to the inlet of the motor 158.

The pump 20 is upstream of the motor 158 for driving it and the motor 158 is upstream of the heat excahnger.

The result is that the heat of the hydraulic fluid which is heated up in motor 158 is used in the heat exchanger 150 to heat the air passing into the fan 120. This causes the fan to deliver heated air which has the effect of drying the hygroscopic pellets as they flow through the tubes 80 preventing clogging.

The heat exchanger 150 has a perforated cover 151 which is shown removed in FIG. 3 to show coils 153 in the heat exchanger 150. In FIG. 3 a modification of the conveyor 52, air manifold 98, and trough 56 are shown, in which a conveyor that has no holes through it dumps fertilizer pellets 250 into the trough from the end of the conveyor.

The frame 32 has right and left wheels 190 adjacent the right and left ends thereof which are common and are for the purpose of preventing the endmost blades 60 from digging into the ground while traveling over uneven terrain.

We claim:

1. An hygroscopic fertilizer applicator, comprising:

a frame having rotatable wheel means mounted thereon to allow movement of said frame along the ground;

a prime mover selectively connected to said frame for moving said frame along the ground;

a plurality of trench-forming means mounted transversely on said frame;

a plurality of fertilizer delivery tubes, each having an inlet and an outlet, connected to said frame;

said delivery tube outlets being disposed adjacent said trench-forming means to deliver fertilizer into a trench formed by said trench-forming means;

a plurality of air conduits connected to said frame, each having an outlet aligned with and spaced away from said delivery tube inlets, each said air conduit having an inlet;

said air conduit outlets and delivery tube inlets disposed to form fertilizer-receiving spaces therebetween;

means on said frame for delivering hygroscopic fertilizer particles to said fertilizer-receiving spaces;

fan means, having an air intake portion and an air exhaust portion, fluidly communicating with said air conduit inlets for propelling air through said conduits, through said fertilizer-receiving spaces and thence through said delivery tubes, for carrying fertilizer particles from said fertilizer-receiving spaces to said trenches;

hydraulic motor means for driving said fan means, mounted on said frame;

an hydraulic pump mounted on said frame for powering said hydraulic motor;

means for selectively powering said hydraulic pump;

hydraulic supply and return lines fluidly connecting said hydraulic pump and hydrualic motor;

a heat exchanger connected to said frame, including a fluid inlet, a fluid outlet, and a fluid coil connecting said fluid inlet and outlet;

said heat exchanger coil being disposed adjacent said air intake portion of said fan means so as to heat air being drawn into said fan, and to cool fluid passing through said coil;

said heat exchanger fluid inlet and outlet being fluidly interposed in said hydraulic fluid return line such that heated hydraulic fluid from said hydraulic motor passes through said heat exchanger coil, is cooled, and continues to said hydraulic pump to then be recirculated back to said hydraulic motor.

* * * * *